July 27, 1943. W. DENNIS 2,325,045
PRODUCTION OF LIQUID CARBON DIOXIDE
Filed Oct. 29, 1941
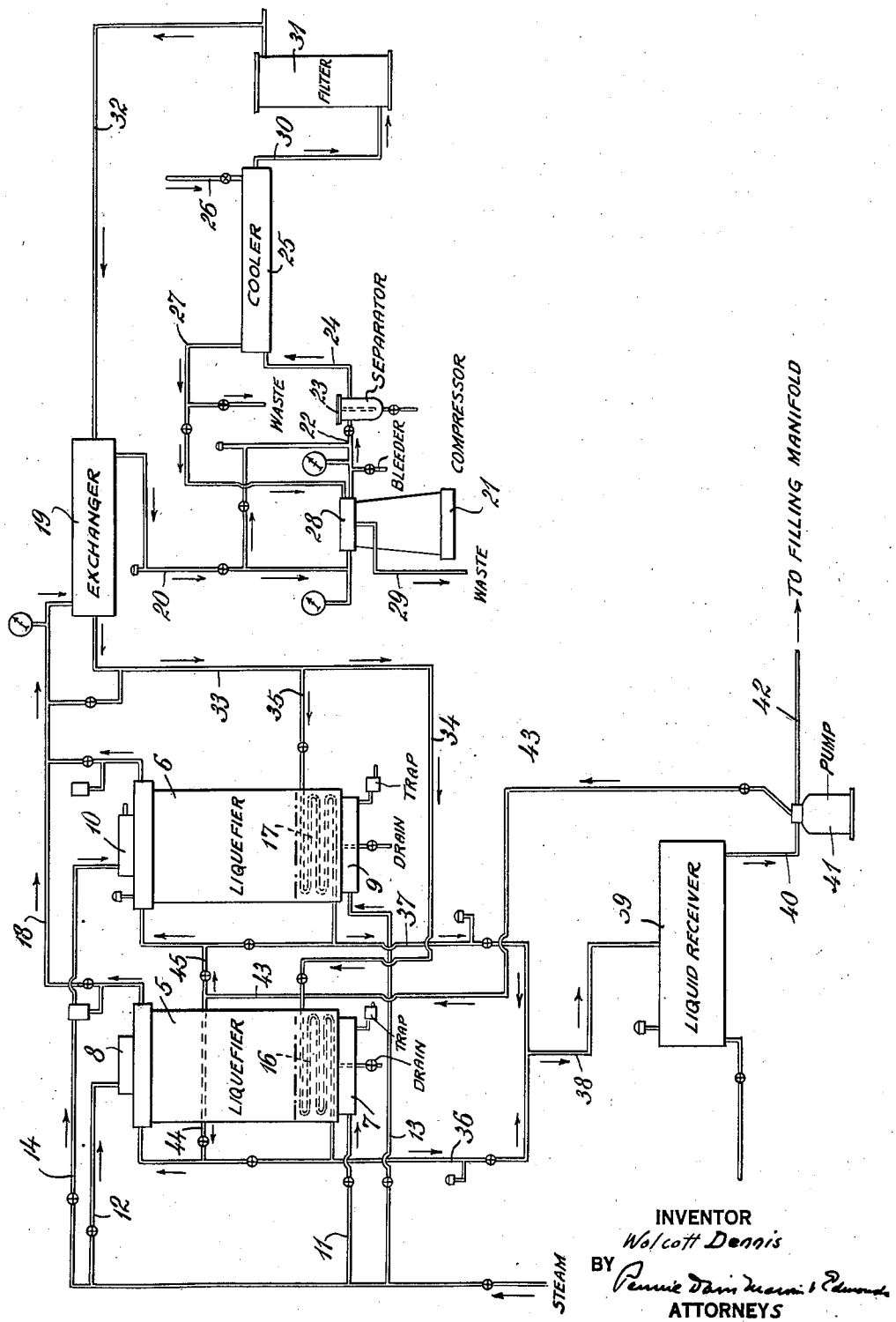
INVENTOR
Wolcott Dennis
BY
ATTORNEYS Patented July 27, 1943

2,325,045

UNITED STATES PATENT OFFICE 2,325,045

PRODUCTION OF LIQUID CARBON DIOXIDE

Wolcott Dennis, Stamford, Conn., assignor to Air Reduction Company, Incorporated, New York, N. Y., a corporation of New York Application October 29, 1941, Serial No. 417,003

12 Claims. (Cl. 62—91.5)

This invention relates to the production of liquid carbon dioxide and particularly to the conversion of solid carbon dioxide to the liquid phase.

Liquid carbon dioxide has been produced and marketed in cylinders under pressure for many years and has been utilized for many industrial purposes including, for example, carbonation of beverages. In recent years, owing to the large industrial production of solid carbon dioxide, much of this material has been utilized by conversion to the liquid phase. A simple method of conversion consists in permitting the solid carbon dioxide to liquefy in a suitable container from which the liquid is withdrawn and delivered, at the high pressure developed within the container, to the cylinder in which it is transported. In another method, the solid carbon dioxide is liquefied and then permitted to vaporize, the vapor being withdrawn at high pressure and condensed by indirect thermal contact with cooling water. The liquid thus produced is then delivered at the high pressure developed to the cylinders. In these methods it is essential that pressures in excess of 1000 pounds per square inch be developed and maintained in the liquefiers. This necessitates liquefiers of strong construction capable of withstanding the pressures developed therein.

A further and more important difficulty with earlier methods results from the fact that oil is used as a plasticizer in the manufacture of solid carbon dioxide. The oil which is retained in the solid carbon dioxide enters the liquefier and inevitably contaminates the liquid product. When such liquid is utilized for industrial purposes, and especially in the carbonation of beverages, the oil, even in the small proportions present, imparts an unsatisfactory taste and odor to the beverage or other material treated, and not infrequently spoils the material so that it cannot be disposed of in commerce.

It is the object of the present invention to avoid the difficulties mentioned and especially to simply and easily eliminate substantially all of the oil which may be present from the liquid product.

Another object of the invention is the provision of a method and apparatus permitting large scale conversion of solid carbon dioxide into liquid dioxide which is substantially free from oil impurities.

Another object of the invention is the provision of a method and apparatus for converting solid carbon dioxide into liquid carbon dioxide which is more economical in operation and ensures a better product than has been available as the result of methods heretofore in use.

Other objects and advantages of the invention will be apparent as it is better understood by references to the following specification and accompanying drawing, which diagrammatically illustrates an apparatus suitable for the practice of the invention.

I have discovered that it is possible to filter substantially all of the oil which may be carried over from the liquefier by the gaseous carbon dioxide released as vapor therein, provided the filtration is accomplished at pressures below 300 pounds per square inch gauge and preferably in the neighborhood of 150 pounds per square inch gauge. Moreover, if the liquefiers are operated at relatively low pressures, above the triple point pressure, for example from 60 to 150 pounds per square inch gauge, most of the oil introduced with the solid carbon dioxide remains in the liquefier because of the relatively low temperature thereof and can be removed therefrom before a fresh charge of solid carbon dioxide is introduced thereto. Furthermore, the maintenance of low pressures in the liquefiers permits the use of receptacles capable of holding a ton or more of solid carbon dioxide at the charge without unduly increasing the weight of the liquefier in order to afford the strength required to permit maintenance of high pressures.

In carrying out the invention, I prefer to employ two liquefiers which after the operation is started are charged alternately with solid carbon dioxide. The melting and vaporization of the solid carbon dioxide is facilitated by an application of a heating agent such as steam, controlled to permit operation in the desired manner. The liquefiers may be constructed of suitable material such as steel and designed to withstand pressures of 200 pounds per square inch gauge with the usual safety factor. The pressure indicated is merely indicative of the preferred pressure limit for the liquefier, as higher pressures can of course be used.

When a portion of the solid carbon dioxide in one of the liquefiers has been liquefied to the desired extent, carbon dioxide vapor is withdrawn continuously, passed through a temperature exchanger and delivered to a compressor where the pressure is increased to the desired point, which, for example, may be approximately 150 pounds per square inch gauge. Thus the vapor may be withdrawn at a pressure of 60 pounds per square inch gauge or higher and compressed to the desired pressure. The temperature is raised by compression, and consequently the vapor is passed through a cooler in which it is subjected to heat exchange with water or other suitable cooling agent. It passes thence to a filter which may be filled with cotton or other suitable material which is adapted to remove the oil from the vapor. As previously indicated, such a filter is effective provided the pressure of the vapor is below 300 pounds per square inch gauge, and it is particularly effective at pressures in the neighborhood of 150 pounds per square inch gauge, at which point it is possible to remove substantially all of the oil present in the vapor, or, in any event, to reduce the proportion of oil to the point where it is no longer detectable in the liquid product or in products treated therewith.

From the filter, the vapor returns through the exchanger previously mentioned, where it is cooled by heat exchange with the vapor leaving the liquefier. It is then delivered to a coil in the liquefier from which the vapor was withdrawn, until such time as the amount of solid or liquid carbon dioxide remaining in that liquefier is sufficient to effect the condensation of the vapor. Thereafter the vapor may be directed through a corresponding coil in the companion liquefier. The liquid resulting from the condensation is delivered to a receiver, from which it is withdrawn by a liquid carbon dioxide pump which delivers the liquid at the required pressure to the filling manifold and thence into the cylinders.

As will be observed from the foregoing description, carbon dioxide in the vapor phase is withdrawn at relatively low pressures from the liquefier in which the pressure is never permitted to develop above the point at which the vapor is removed. The vapor, after giving up its low temperature, is recompressed to a pressure which is still relatively low and at which the oil content may be removed readily by simple filtration. Thereafter, the vapor, after being initially cooled by heat exchange with vapor leaving the liquefier, is subjected to heat exchange with liquefying solid carbon dioxide to convert it to the liquid phase. The liquid is still at low pressure and is then pumped to the desired pressure which it is necessary to maintain in the filled cylinders.

In order that the invention may be more clearly understood, reference is made to the accompanying drawing. The temperatures and pressures and other details hereinafter mentioned are merely illustrative of the preferred embodiment of the invention in its practical application to commercial production of liquid carbon dioxide. Other pressures and temperatures may be used, so long as the fundamental purpose is maintained, that is, the withdrawal of carbon dioxide vapor from the liquefier at relatively low pressure, filtration of the vapor at low pressure, and condensation of the vapor to liquid while the vapor is still at low pressure by heat exchange with melting solid carbon dioxide. The operation as thus carried out is economical both with respect to the installation and maintenance of the apparatus and the power consumed in the operation. It ensures the production of liquid carbon dioxide which is free from oil contamination.

Referring to the drawing, 5 and 6 indicate liquefiers of suitable construction, the details of which form no part of the present invention. The liquefiers are provided with steam compartments 7, 8, 9 and 10, which are adapted to be supplied with steam from a suitable source through pipes 11, 12, 13 and 14, suitable valves being provided to control the admission of steam in order to regulate the operation as hereinafter described. The liquefiers 5 and 6 are also provided with coils 16 and 17, the purpose of which will be explained hereinafter. A pipe 18 is connected by branches to both of the liquefiers 5 and 6 and to a heat exchanger 19 of usual construction. From the exchanger the vapor delivered through the pipe 18 passes through a pipe 20 to a compressor 21 where its pressure is increased to the desired point. A pipe 22 delivers the compressed vapor to a trap 23 which separates any liquid therein contained, and the vapor is delivered through a pipe 24 to a cooler 25 supplied with water or other suitable cooling agent to a pipe 26. The water escapes through a pipe 27 and may be delivered to the head 28 of the compressor to effect the cooling thereof and thence wasted through a pipe 29.

The vapor is delivered through a pipe 30 from the cooler 25 to a filter 31 which as hereinbefore indcated may be filled with cotton or other suitable filtering material which removes oil from the vapor. Thence the vapor passes through a pipe 32 to the exchanger 19 and is delivered through a pipe 33 and branch 34 to the coil 16 in the liquefier 5 or alternately through a branch 35 to the coil 17 and the liquefier 6. From either of the coils the condenser vapor or carbon dioxide liquid is withdrawn through branches 36 and 37 to a pipe 38 which delivers the liquid to the liquid receiver 39. Thence it is withdrawn through a pipe 40 and compressed by the liquid carbon dioxide pump 41. The compressed liquid is delivered through a pipe 42 to the filling manifold, (not shown). A pipe 43 connected to the liquid carbon dioxide pump returns any vapor which is formed by evaporation of the liquid through branches 44 and 45 to the liquefiers 5 and 6, so that the vapor is returned to the cycle.

In the operation of the apparatus, both of the liquefiers 5 and 6 are initially charged with solid carbon dioxide, and steam is supplied in quantity sufficient to cause the solid carbon dioxide to partially melt. When the liquid level in the liquefier 5 has reached the point where the liquefier is approximately half filled with liquid, the vapor is withdrawn through the pipe 18. At this point no vapor is withdrawn from the liquefier 6, and heating is discontinued in the latter liquefier when the liquid level is such that the liquefier is approximately one-quarter filled with liquid. The temperature in both liquefiers will be at approximately $-70°$ F. The vapor withdrawn from the liquefier 5 at pressures preferably between 60 and 150 pounds per square inch gauge passes through the exchanger 19 and thence to the compressor 21, where the pressure is increased, if necessary, to approximately 150 pounds per square inch gauge. In passing through the exchanger 19, the vapor which is approximately at $-70°$ F. has its temperature raised to approximately $68°$ F. After compression, the vapor is at approximately $167°$ F. and is cooled in the cooler 25 to approximately $86°$ F. At the latter temperature and at a pressure of approximately 150 pounds per square inch gauge, the vapor passes through the filter 31 which removes the oil. Thereafter the vapor in passing through the exchanger 19 is reduced in temperature to approximately $-33°$ F. and is delivered to the coil 16 in the liquefier 5. The vapor is readily condensed and is delivered to the receiver 39 at a temperature of approximately −43° F.

When the liquid level in the liquefier 5 has been reduced by vaporization, owing to the introduction of steam and the passage of vapor through the coil 16, to the point where the liquefier is only about one-quarter filled with liquid, the vapor returning from the filter 31 is diverted to the coil 17 in the liquefier 6. Meanwhile steam is maintained in the liquefier 5 to melt any remaining solid carbon dioxide and to vaporize the liquid until finally the liquefier is exhausted. At this point, vapor is withdrawn from the liquefier 6 and delivered through the pipe 18 to the cycle. The liquefier 5 is opened and recharged with solid carbon dioxide, and steam is supplied until the liquid level reaches the point where the liquefier is approximately one-quarter filled with liquid. At this point the steam is shut off and the liquefier is held in reserve until such time as it may be necessary in accordance with the cycle to divert the filtered carbon dioxide vapor through the coil 16. Meanwhile the vapor passes through the coil 17 in the liquefier 6, is liquefied and delivered to the liquid carbon dioxide receiver 39 as previously described. The cycle is continued by alternately filling the liquefiers 5 and 6 with solid carbon dioxide and controlling the conversion of the solid to liquid and vapor phases in the manner hereinbefore described.

As will be readily understood, many of the details such as pressure gauges, sight gauges, pressure relief valves, drain pipes and other valves which are common to this type of apparatus are not illustrated and described, since they form no part of the invention and would be applied and utilized in similar arrangements by anyone skilled in the art. The omission of such illustration and description is merely to simplify the specification and to clarify the invention and the essential features thereof.

The method and apparatus as described has been demonstrated in practical operation to afford considerable economy, both in installation and maintenance, but it is particularly effective in the large scale production of liquid carbon dioxide free from oil contamination.

Various changes may be made in the form and arrangement of the apparatus as well as in the details of operation without departing from the invention or sacrificing the advantages thereof.

I claim:

1. The method of converting solid carbon dioxide to the liquid phase which comprises subjecting vapor from the solid carbon dioxide at a pressure below 300 pounds per square inch gauge to filtration to remove oil therefrom and thereafter conducting the vapor in heat exchange relation with solid carbon dioxide, thereby condensing the vapor, and withdrawing the liquid product.

2. The method of converting solid carbon dioxide to the liquid phase which comprises subjecting vapor from the solid carbon dioxide at a pressure above 60 and below 300 pounds per square inch gauge to filtration to remove oil therefrom and thereafter conducting the vapor in heat exchange relation with solid carbon dioxide, thereby condensing the vapor, and withdrawing the liquid product.

3. The method of converting solid carbon dioxide to the liquid phase which comprises subjecting vapor from the solid carbon dioxide at a pressure between 60 and 150 pounds per square inch gauge to filtration to remove oil therefrom and thereafter conducting the vapor in heat exchange relation with solid carbon dioxide, thereby condensing the vapor, and withdrawing the liquid product.

4. The method of converting solid carbon dioxide to the liquid phase which comprises heating the solid carbon dioxide, withdrawing and compressing vapor therefrom and conducting the vapor in heat exchange relation with solid carbon dioxide, thereby condensing the vapor.

5. The method of converting solid carbon dioxide to the liquid phase which comprises heating the solid carbon dioxide, withdrawing and compressing vapor therefrom, filtering the vapor to remove oil therefrom and conducting the vapor in heat exchange relation with solid carbon dioxide, thereby condensing the vapor.

6. The method of converting solid carbon dioxide to the liquid phase which comprises heating the solid carbon dioxide, withdrawing and compressing vapor therefrom to a pressure below 300 pounds per square inch gauge, filtering the vapor at that pressure to remove oil therefrom and conducting the vapor in heat exchange relation with solid carbon dioxide, thereby condensing the vapor.

7. The method of converting solid carbon dioxide to the liquid phase which comprises heating the solid carbon dioxide, withdrawing and compressing vapor therefrom to a pressure between 60 and 150 pounds per square inch gauge, filtering the vapor at that pressure to remove oil therefrom and conducting the vapor in heat exchange relation with solid carbon dioxide, thereby condensing the vapor.

8. The method of converting solid carbon dioxide to the liquid phase which comprises heating separate masses of solid carbon dioxide, withdrawing vapor from one of the masses, compressing the vapor and returning it in heat exchange relation with the mass from which it was withdrawn until the latter is substantially exhausted and then in similar relation with the other mass, thereby condensing the vapor.

9. The method of converting solid carbon dioxide to the liquid phase which comprises heating separate masses of solid carbon dioxide, withdrawing vapor from one of the masses, compressing the vapor, filtering the vapor to remove oil therefrom and returning it in heat exchange relation with the mass from which it was withdrawn until the latter is substantially exhausted and then in similar relation with the other mass thereby condensing the vapor.

10. The method of converting solid carbon dioxide to the liquid phase which comprises heating separate masses of solid carbon dioxide, withdrawing vapor from one of the masses, compressing the vapor to a pressure below 300 pounds per square inch gauge, filtering the vapor at that pressure to remove oil therefrom and returning it in heat exchange relation with the mass from which it was withdrawn until the latter is substantially exhausted and then in similar relation with the other mass thereby condensing the vapor.

11. The method of converting solid carbon dioxide to the liquid phase which comprises heating separate masses of solid carbon dioxide, withdrawing vapor from one of the masses, compressing the vapor to a pressure between 60 and 160 pounds per square inch gauge, filtering the vapor at that pressure to remove oil therefrom and returning it in heat exchange relation with the mass from which it was withdrawn until the latter is substantially exhausted and then in similar relation with the other mass, thereby condensing the vapor.

12. The method of converting solid carbon dioxide to the liquid phase which comprises heating separate masses of solid carbon dioxide, withdrawing vapor from one of the masses, compressing the vapor, returning it in heat exchange relation with the mass from which it was withdrawn until the latter is substantially exhausted and then in similar relation with the other mass thereby condensing the vapor, and thereafter withdrawing vapor from said other mass and repeating the cycle.

WOLCOTT DENNIS.